Sept. 8, 1953  H. STIEBING  2,651,111
APPARATUS FOR DRAWING A CENTRAL PERSPECTIVE REPRESENTATION
Filed Aug. 20, 1952  5 Sheets-Sheet 1
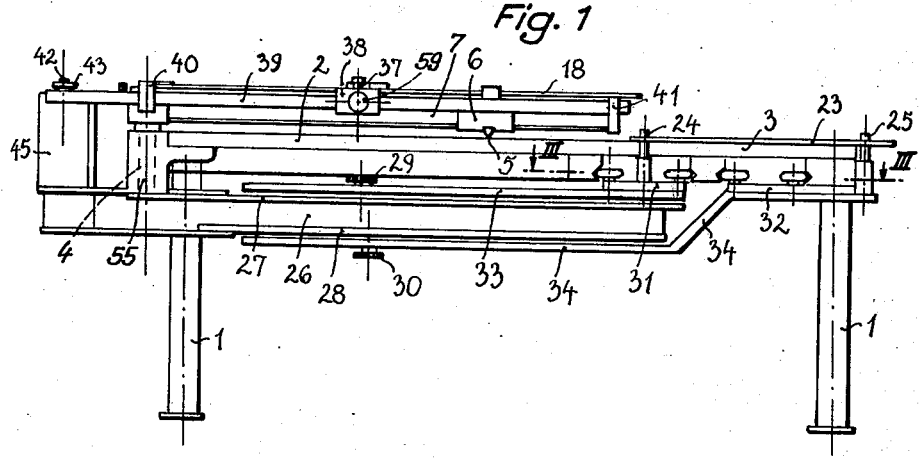
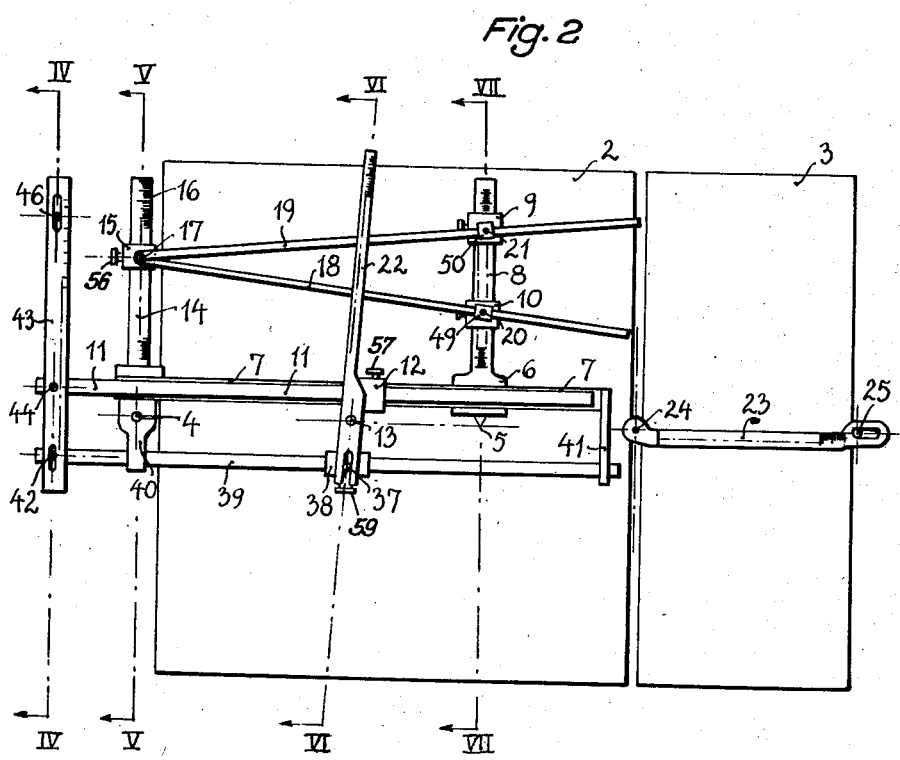
Inventor:
HEINRICH STIEBING Sept. 8, 1953     H. STIEBING     2,651,111
APPARATUS FOR DRAWING A CENTRAL PERSPECTIVE REPRESENTATION
Filed Aug. 20, 1952     5 Sheets-Sheet 2
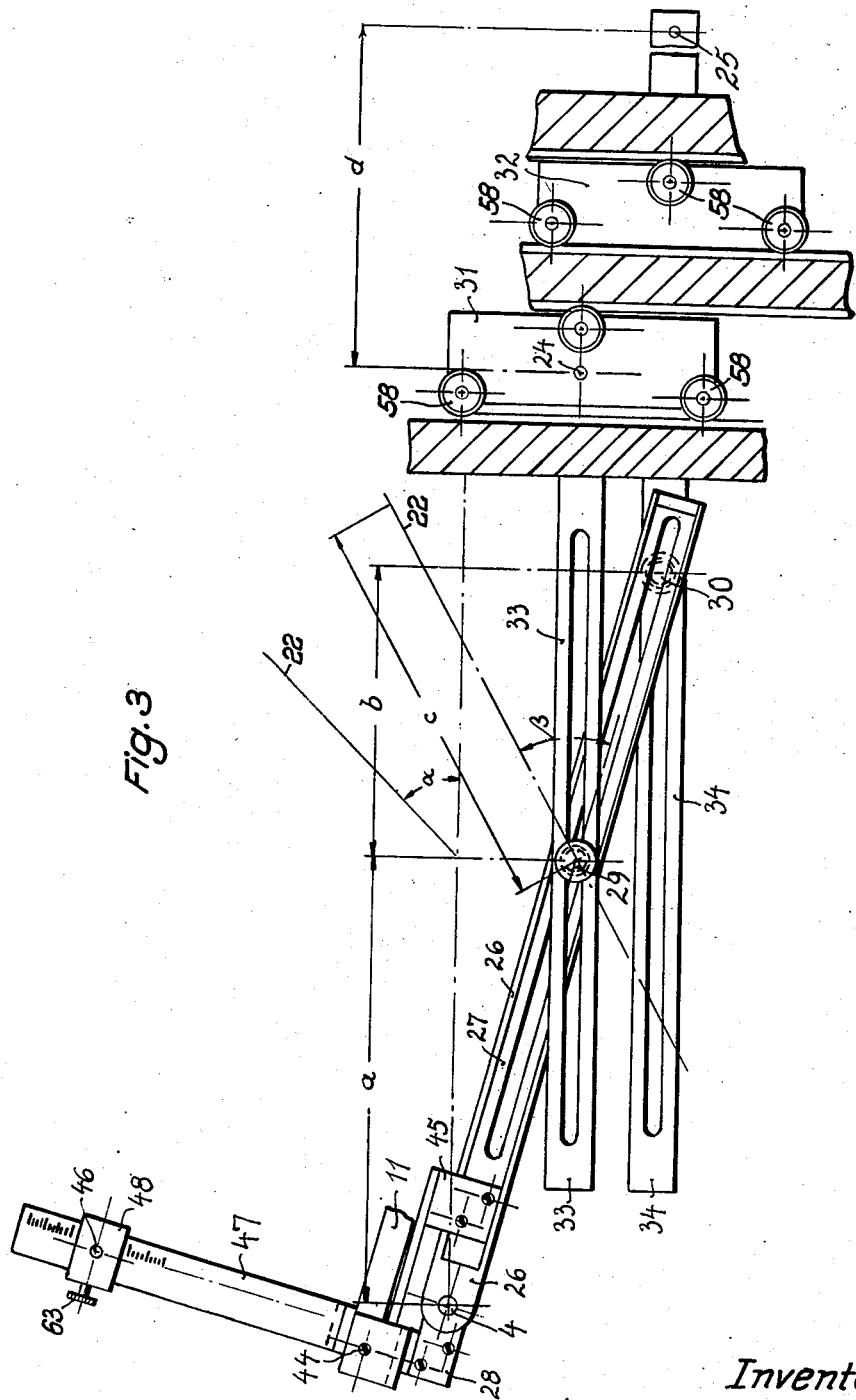
Inventor:
HEINRICH STIEBING
By

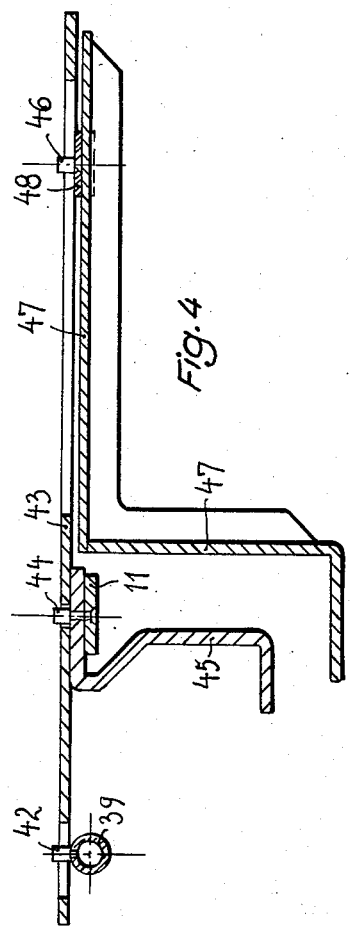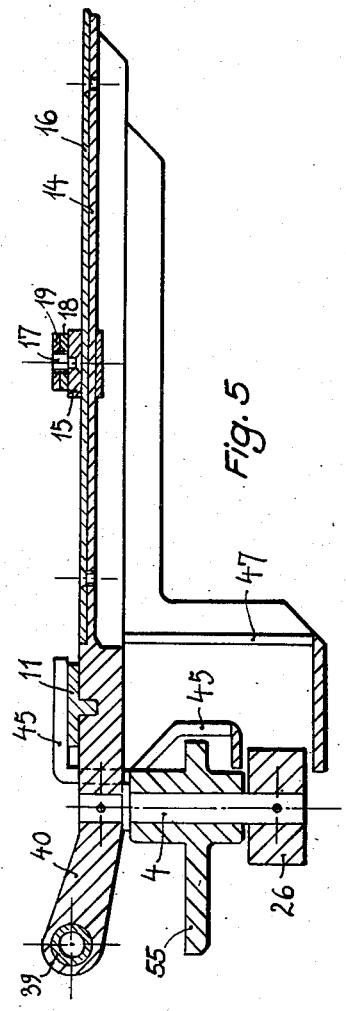

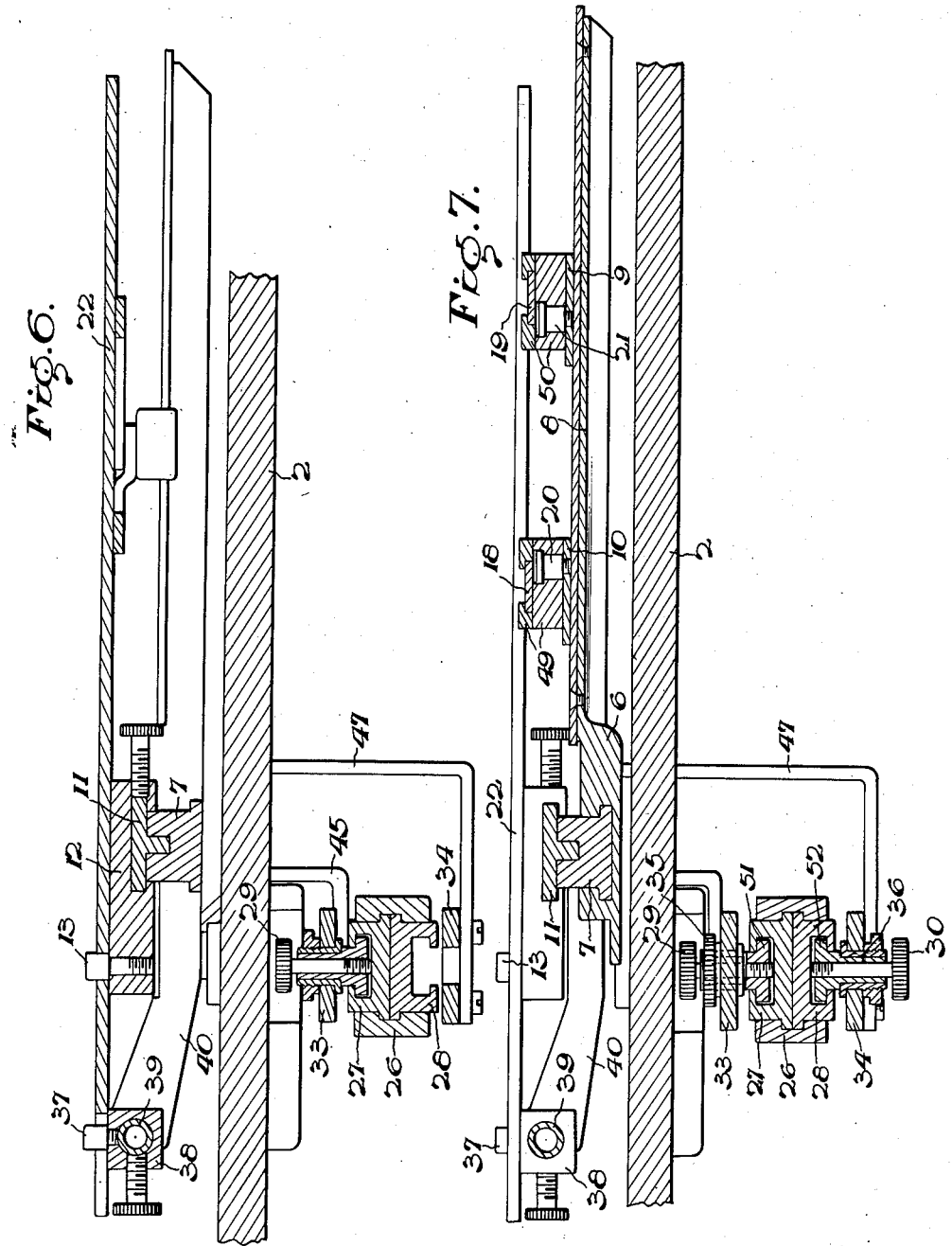

Sept. 8, 1953            H. STIEBING            2,651,111

APPARATUS FOR DRAWING A CENTRAL PERSPECTIVE REPRESENTATION

Filed Aug. 20, 1952            5 Sheets-Sheet 5

Inventor:
HEINRICH STIEBING
By
Atty.

Patented Sept. 8, 1953

2,651,111

UNITED STATES PATENT OFFICE 2,651,111

APPARATUS FOR DRAWING A CENTRAL PERSPECTIVE REPRESENTATION

Heinrich Stiebing, Hattingen, (Ruhr), Germany, assignor to Franz Kuhlmann K.-G., Werkstätten für Präzisionsmechanik und Maschinenbau, Wilhelmshaven, Germany, a partnership Application August 20, 1952, Serial No. 305,419
In Germany May 11, 1951

10 Claims. (Cl. 33—77)

My invention relates to an apparatus for drawing a central perspective representation of an object, such as a building or a machine, on the basis of ordinary drawings representing orthogonal projections, i. e. a plan view, an elevation and side views of the object.

It is the object of my invention to provide an apparatus of this character which can be easily operated by any draftsman without requiring any expert knowledge of the laws of central perspective representation. It is another object of my invention to provide an apparatus of the character indicated in which the plane of projection of the perspective picture may be vertical or inclined forwardly or rearwardly as desired, and in which the viewing center is adjustable to any desired elevation between wide limits thus enabling the operator to draw a perspective bird sight view or a perspective frog sight view of the object. More particularly, it is the object of the invention to provide an apparatus of the character indicated in which a plan view is fixed to one section of a drawing board forming part of the apparatus, and in which a rule permitting the operator to draw the perspective view is movable on another section of the drawing board, additional information being required regarding the elevation of any point of the object, such additional information being supplied, for instance, by a front view and by side views of the object. Finally, it is an object of the invention to provide an apparatus of the character indicated in which the location of the viewing center and the location and inclination of the plane of projection with respect to the object may be arbitrarily chosen by the draftsman so that any desired perspective view of the object may be attained.

Further objects of my invention will appear from the description of a preferred embodiment of the invention following hereinafter and the features of novelty will be pointed out in the claims.

In the drawings such preferred embodiment is shown in detail, it being understood that the detailed description serves the purpose of explanation rather than of limitation of the invention.

In the drawings,

Fig. 1 is an elevation of the novel drawing apparatus,

Fig. 2 is a plan view of the apparatus shown in Fig. 1,

Figure 8:
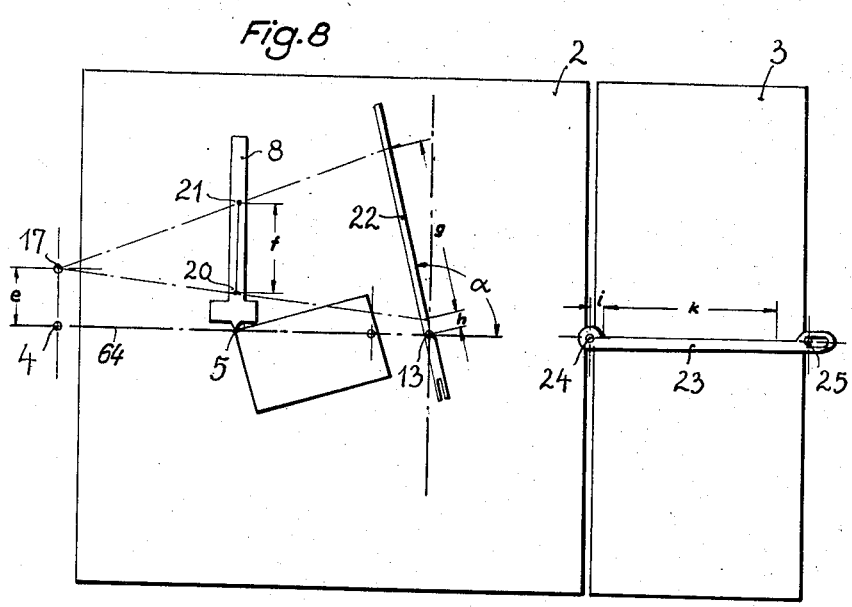
Figure 9:
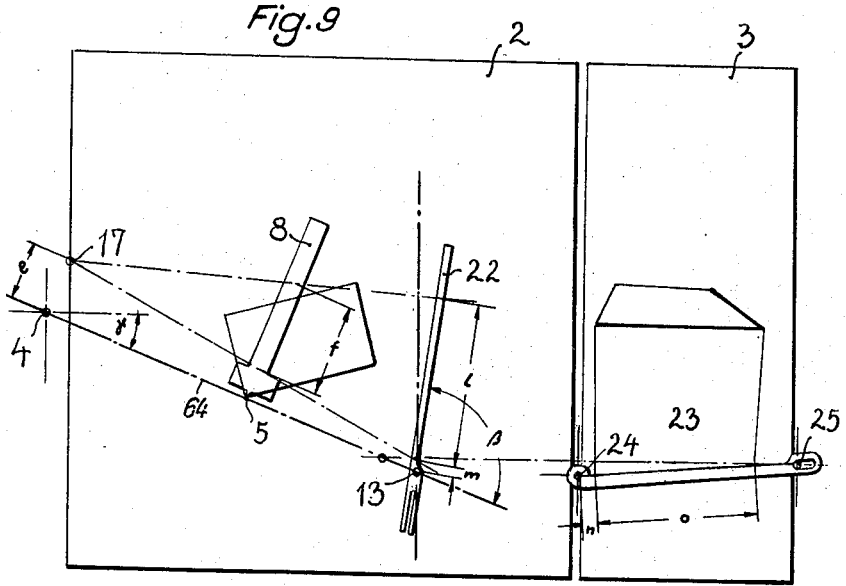

Fig. 3 is the plan view of those elements shown in Fig. 1 as are located beneath the drawing board, partly in section taken along the line III—III of Fig. 1, the drawing board itself being omitted, Fig. 4 is a vertical section taken along the line IV—IV of Fig. 2, Fig. 5 is a vertical section taken along the line V—V of Fig. 2, Fig. 6 is a vertical section taken along the line VI—VI of Fig. 2, Fig. 7 is a vertical section taken along the line VII—VII of Fig. 2, Fig. 8 is a diagrammatic plan view of the device similar to that of Fig. 2 illustrating the drawing of a vertical edge of a building, a projection upon the drawing board of the viewing direction coinciding with the heavy dash-dotted line extending parallel to the lower edge of the drawing board, Fig. 9 is a diagrammatic plan view similar to that of Fig. 8 in which the projection upon the drawing board of the viewing direction is inclined by the angle $\gamma$.

My novel drawing apparatus comprises a drawing board carried by a suitable frame 1 and composed of a left hand section 2 and a right hand section 3. A drawing representing the plan view of the object, such as a building or the like, is to be fixed on the section 2 of the drawing board, whereas the perspective drawing will be produced on a sheet of paper fixed to the section 3 with the aid of a rule guided thereon to be described later. A bracket 55 shown in Fig. 1 is fixed to the left edge of section 2 of the drawing board near the center of such left edge and is provided with a bore in which a pin 4 is journalled. This pin which extends perpendicularly to the drawing board projects upwardly and downwardly. To its upper end a substantially horizontal arm 40, 14 is fixed which is provided with a scale 16 and is rigidly connected with a bar 7 that extends at right angles to the pin 4 and the arm 40, 14 and is disposed above section 2 of the drawing board, being swingable thereon about the pivot 4. This bar will be referred to hereinafter as the viewing direction bar. A slide 6 provided with a forwardly and downwardly projecting pointer 5 is slidably guided on the bar 7 and may thus be moved into registry with any desired point of the drawing fixed to section 2 of the drawing board. The slide 6 is formed with an arm 8 extending parallel to the arm 14. There are two adjustable slides 9 and 10 on the arm 8, as will appear from Figs. 2 and 7. Each of such slides carries a trunnion 20, or 21 respectively. On such trunnion a guiding member 49, or 50 respectively is journalled, the guiding member being provided with a guideway extending at right angles to the trunnion and accommodating a radius element 18, or 19 respectively which, in the embodiment shown, is formed by a bar. The radius bars 18 and 19 are pivotally mounted on a common pin 17 projecting from a slide 15 which is slidably guided on the arm 14 and may be fixed at any adjusted position by a clamping screw 56.

The viewing direction bar 7 is provided with a longitudinal groove constituting a guideway for an element 11 on which a bar 22 representing the picture plane is pivotally mounted. In the present embodiment, the element 11 is formed by a rod which projects to the left beyond the arm 14, 40 and is straddled by a block 12 slidably mounted thereon and held in any adapted position by a clamping screw 57 (Figs. 2 and 6). This clamping screw engages a tapped bore of block 12 and may be pressed against the rear edge of the rod 11. A pivot pin 13 serves to pivotally connect block 12 and bar 22. The bar 22 is provided with a graduation and preferably consists of transparent material.

Section 3 of the drawing board is formed with four parallel recesses on its lower side constituting guideways which are spaced from the axis 4 and serve the purpose of guiding two carriages 31 and 32 shown in Fig. 3, each carriage being provided with suitable wheels 58 which are running in grooves provided in the side walls of the recesses, whereby the carriages will be retained in the recesses.

Each of the two carriages is provided with a trunnion 24, or 25 respectively which projects upwardly past the respective lateral edge of section 3 of the drawing board above the top level of the same. A rule 23 of transparent material with a graduation similar to that of the picture plane representing bar 22 rests on top of the section 3 of the drawing board and is mounted on the trunnions 24 and 25, the latter extending to a slot provided in the rule.

In this manner, the rule 23 is guided transversely on the drawing board by the pair of carriages 31, 32. Suitable actuating means are connected to the carriages and are movable in response to a rocking motion of the viewing direction bar 7. For that purpose, a guiding bar 26 is rigidly connected to the lower end of pin 4 and is thereby rigidly connected with the viewing direction bar 7 extending parallel thereto. Each of the carriages 31 and 32 is provided with a cantilever 33, or 34 respectively, which extends parallel to the front edge of the drawing board and crosses the guiding bar 26. Preferably, the two cantilevers 33 or 34 are differently spaced from the drawing board and the guiding bar extends between them. Pivot pins 29 and 30 which are to be described at greater detail hereinafter serve the purpose of pivotally and slidably connecting the guidebar 26 to each of the two cantilevers 33 and 34. Hence, when the bars 7 and 26 are rocked about the axis of pivot 4, the two carriages 31 and 32 will be displaced within their guideways, the difference of such displacement depending upon the distance of the pins 29 and 30. That distance, however, is adjustable, as will appear later.

The pivotal movement of the viewing direction bar 22 will control a linkage now to be described which is linked to the picture plane representing bar 22 and will thus impart a rocking motion to the latter. The linkage comprises a two-armed lever 43 fulcrumed to the left end of the rod 11 which, as will be remembered, extends parallel to the viewing direction bar 7 and is guided along the same. A link 39 is connected to the forward end of lever 43 by a pin 42 engaging a longitudinal slot of lever 43. Moreover, link 39 has a slide 38 which may be fixed in any desired position by a clamping screw 59 (Figs. 2 and 6) and has an upwardly projecting pivot pin 37 straddled by the fork-shaped forward arm of the picture plane representing bar 22. The link 39 is slidably guided in arm 40 and in a bracket 41 attached to bar 7.

The rod 11 is rigidly connected by a bridge member 45 (Figs. 3 and 6) to a bar 27 which extends lengthwise of bar 26 and is longitudinally slidable therein, the bar 26 being provided with a slot accommodating the bar 27. Another similar bar 28 is provided in the same slot and is likewise longitudinally movable therein. Each of the two bars 27 and 28 which are mounted in contact with one another, as shown in Figs. 6 and 7, is provided with a longitudinal guideway. The guideway of the lower bar 28 slidably accommodates a member 52 which is provided with a shouldered and threaded stud 60. Rotatably mounted on the stud 60 in engagement with the shoulder thereof is a threaded flanged sleeve 61 which extends through the longitudinal slot of the cantilever 34 and may be clamped thereto by a nut 36 engaging the threads of sleeve 61. In this manner, the sleeve 61 may be clamped to any desired position of the cantilever 34. The sleeve is freely rotatable on the stud 60. The stud 60, in its turn, may be clamped to any desired position of the bar 28.

For that purpose, the stud and the member 52 integral therewith have an axial threaded bore accommodating a headed screw 30. By tightening screw 30 the member 52 may be clamped to any desired point of bar 28.

In exactly the same manner the member 51 may be clamped by screw 29 to any desired point of bar 27, and a sleeve 62 freely rotatable on the member 51 may be clamped by means of a nut 35 to any desired point of the longitudinal slot of cantilever 33.

The rear arm of lever 43 has a longitudinal slot engaged by a pin 46 which is carried by a slide 48 clamped by a clamping screw 63 to the arm 47 of an offset bracket. The bracket extends to the end of cantilever 34 and is fixed to the bottom thereof by two spaced screws shown in Fig. 6.

Since the objects to be represented are of a three-dimensional nature, the surface of the section 2 of the drawing board is used as the plan view plane as well as the plane of the elevational view. One use serves the purpose of determining the location and direction of the lines representing edges or other vertical lines of the building or other object by positioning the rule 23, whereas the other use of the section 2 of the drawing board serves the purpose of determining the location of the upper and lower end of such line. In the explanation following hereinafter the section 2 of the drawing board will be referred to as the plan view plane in connection with the first mentioned use thereof, and it will be referred to as the elevational plane in connection with the second use thereof.

The axis 4 about which the parallel bars 7 and 26 are pivotal, constitutes the viewing center of the plan view plane, i. e. the location of the spectator looking towards an imaginary model of the object erected on the plan view thereof fixed to section 2 of the drawing board. The perspective drawing to be produced on section 3 of the drawing board by means of the rule 23 represents the image perceived by the spectator. The level of the viewing center may be chosen at any desired distance from the drawing board above the same.

In Fig. 8 I have indicated the plan view of a rectangular building as being placed on section 2 of the drawing board at the desired distance and in the desired angular position with respect to the viewing center 4. Preferably, the sheet of paper bearing the plan view is so located that the central portion of the building will be intersected by the heavy dash-dotted line extending through the viewing center 4 parallel to the front edge of the drawing board.

For the purpose of drawing lines representing the edges of the rectangular building, the draftsman will first make certain adjustments to be described later and will then angularly adjust bar 7 and slidably adjust slide 6 thereon so as to bring the pointer 5 successively into registry with the corners of the plan view of the building. Such movement of bar 7 will result in an adjustment of rule 23. Whenever pointer 5 has been adjusted, the draftsman will draw a line along the upper edge of rule 23. The heavy dash-dotted line 64 connecting points 4 and 5 in Figs. 8 and 9 represents a projection upon the drawing board of the spectator's viewing direction, such line extending parallel to the viewing direction bar 7 and intersecting the picture plane representing bar 22 at the fulcrum 13 thereof. Thus, it will be appreciated that a vertical plane extending through the axis 4 and the pointer 5 will intersect the plan view plane along the line 64. This line will be referred to hereinafter as the viewing line projection.

Once the draftsman has drawn a line representing a vertical edge of the building by means of rule 23 on the sheet fixed to section 3 of the drawing board, he must determine the upper and lower end of such line. For that purpose, the two arms 14 and 8, the radius elements 18, 19 and the picture plane representing bar 22 are provided. The draftsman will adjust the two slides 9 and 10 to such positions indicated on the scale of arm 8 as correspond to the level of the upper and lower corner of the edge of the building. Moreover, he will adjust the slide 15 by means of scale 16 to the level of the viewing center above the ground level. It will now be appreciated that the central perspective view to be drawn can be represented by the elements 18 and 19 when the same are regarded as being positioned within the elevational plane. The picture plane represented by bar 22 will intersect the ground level along a line that crosses the viewing line projection at point 13. When bar 7 is angularly adjusted about the viewing center 4, the point 13 is so guided by suitable displacement of the interconnected slidable bars 11 and 27 and by the consequent displacement of link 39 as to move forward and rearward in a direction extending parallel to the left hand edge of the drawing board. The path thus described by point 13 is the line of intersection of the picture plane with the plan view plane. This line will be referred to hereinafter as the picture plane intersection line. The picture plane, as stated above, may be placed perpendicularly to the plan view plane or may form any desired angle $\alpha$ therewith which is indicated in Figs. 3 and 8. Under any circumstances, however, the picture plane will intersect the plan view plane along a line extending through point 13 parallel to the lateral edge of the drawing board.

For a better understanding of the function of the elements 18, 19 and 22 it may be well to imagine that the upper portion of the drawing board located behind the line 64 in Figs. 8 and 9 will be folded upwards so as to place the pivot point 17 at the eye level of the imaginary spectator. The two radius bars 18 and 19 represent the directions in which the spectator views the upper corner and the lower corner of the edge to be drawn, such corners being represented by the pivot pins 20 and 21 of slides 10, 9. The bar 22 represents the picture plane or, strictly speaking, the intersection thereof with the common plane of the two radii 18 and 19. Since the bar 22 is transparent and is provided with a graduation, the draftsman may read the distance of the crossing points with the radii 18 and 19 from point 13. In Fig. 8, the distance of the lower corner from point 13 is designated by $h$ and the length of the edge of the building by $g$.

Recapitulating the theory explained hereinabove, the point 4 is the viewing center in the plan view plane. The point 17 is the viewing center in the elevational plane. The points 20 and 21 are the upper and lower ends of a vertical line of the object, such as the upper and lower corner of an edge of a building. The radii 18 and 19 are the viewing directions of a spectator looking from point 17 to such corners, and the intersection of the radii with the bar 22 are the points of intersection of the viewing directions with the picture plane.

Whereas Fig. 8 represents the case where the viewing line projection 64 extends parallel to the front edge of the drawing board, Fig. 9 represents a case where the viewing line projection 64 forms the angle $\gamma$ with the front edge of the drawing board, the bar 7 having been angularly adjusted about the pivot 4 accordingly. The picture plane intersecting line, however, is the same as before. The viewing line projection 64 intersects the picture plane intersection line at point 13 which, in Fig. 9, has been moved to the front compared with Fig. 8. An imaginary plane accommodating the spectator's eye and the vertical edge of the building to be drawn will intersect the picture plane no longer at the angle $\alpha$ but under the new angle $\beta$. The following geometrical relationship exists between the three angles $\alpha, \beta, \gamma$:

$$\tan \beta = \tan \alpha \cdot \cos \gamma$$

The linkage connected to the viewing direction bar 7 to be controlled by the pivotal movement thereof and linked to the picture plane representing bar 22 to rock the same in response to such pivotal movement is so designed as to automatically adjust the bar 22 in accordance with the proper angle $\beta$.

The pivot 51, 62, 29 will be always so adjusted as to coincide with point 13. Therefore, the pivot 24 of the rule 23 will be always positioned by the cantiliver 33 to register with point 13. As stated above, the rule 23 is provided with a graduation similar to that of bar 22. When the picture plane represented by bar 22 stands at right angles to the plan view plane, angle $\alpha$ being equal to 90°, the two pivots 51, 62, 29 and 52, 61, 30 will be adjusted to co-axial positions and, as a result, the two cantilevers 33, 34 will be guided in coincidental positions, the rule 23 being kept parallel to the front edge of the drawing board. The pivot 24 of the rule 23 corresponds to the point 13 of the picture plane representing bar 22. The perspective view drawn on section 3 of the drawing board is to be viewed at from the left, the right hand edge of the drawing board being the top edge of the perspective representation drawn. After the draftsman has determined the upper and lower point on the bar 22 defined thereon by the radii 18, 19, he will mark the corresponding points on the rule 23 using the graduation thereon, the distance $i$ corresponding to the distance $h$ and the distance $k$ corresponding to the distance $g$ in Fig. 8. Line $k$ is the proper perspective representation of the left corner of the building pointed at by the pointer 5 in Fig. 8. In this manner, all of the vertical lines of the building, such as the edges thereof, may be drawn on the section 3 of the drawing board. The inclined or horizontal lines of the building are drawn by properly connecting the ends of the vertical lines.

The adjustments of the apparatus to be effected before the drawing operation commences will now be described:

First the slide 15 will be so adjusted as to place pivot 17 to the proper level indicated by the scale 16. For a normal perspective picture, for instance as viewed by a person standing on ground level, pivot 17 will be positioned to a point corresponding to an elevation of about five to six feet above ground level. For a bird sight view pivot 17 will be pushed all the way up, and for a frog sight view it will be pushed all the way down. In adjusted position slide 15 is arrested by tightening clamping screw 56. Next, slides 12 and 38 are so adjusted as to place the bar 22 representing the picture plane to the proper position with respect to the spectator's eyes, to wit with respect to slide 15. When the object to be represented is a building, bar 22 will be placed so as to extend parallel to the lateral edge of the drawing board, the angle $a$ amounting to 90°.

Moreover, the pivot 51, 62, 29 is slid in the guiding slots of slide bar 27 and of cantilever 33 to a position in which it is co-axial with pivot 13 of the picture plane representing bar 22. In that position nut 62 and screw 29 are tightened to arrest the pivot in adjusted position. Also, the pivot 52, 61, 30 must be adjusted. It will be moved to a position co-axial with pivot 51, 62, 29, if the bar 22 is adjusted to a position parallel to the lateral edge of the drawing board, the angle $a$ amounting to 90°. For any angle $a$ other than 90°, however, the proper distance $b$ (Fig. 3) is read from a table amounting to $d \cdot \cos a$, $d$ being the distance of the paths described by the pivots 24 and 25, as indicated in Fig. 3.

The slide 48 is adjusted to proper position by means of a graduation provided on bracket 47 and secured in such position by tightening the clamping screw 63. The proper adjustment depends on the location of the picture plane, i. e. on the angle $a$ of initial inclination of bar 22 relative to the front edge of the drawing board.

The various graduations are preferably provided on detachable scales which may be exchanged whereby the scales may be readily adapted to the desired size of the perspective representation.

As stated hereinabove, the bar 22 and the rule 23 are preferably made of a transparent material.

While I have described my invention with reference to a specific embodiment thereof, I wish it to be clearly understood that the same is capable of numerous modifications within the scope of the appended claims.

Thus, the radius elements 18, 19 may be formed by light beams or by flexible elements. The transfer of the respective perspective points and of the displacement and inclination of the picture plane representing element 22 to the section 3 of the drawing board may be carried out by electrical, fluid-operated or pneumatic control elements rather than by mechanical means.

What I claim is:

1. Apparatus of the character described for drawing a central perspective representation of an object comprising a drawing board, a viewing direction bar, means for pivotally mounting said bar about an axis extending perpendicularly to said drawing board in stationary relation thereto and representing the viewing center, a first arm rigid with said viewing direction bar, a second arm slidable on said viewing direction bar, a slide on said first arm representing the elevation of the viewing center, adjustable slides guided on said second arm representing the upper and lower ends of vertical lines of the object, radius elements each connecting said slide to said adjustable slides, an element guided along said viewing direction bar, a picture plane representing bar crossing said radius elements and pivotally carried by said element, means for guiding said element parallel to said arms, a linkage connected to said viewing direction bar to be controlled by the pivotal movement thereof and linked to said picture plane representing bar to rock the same in response to such pivotal movement, a rule, guiding means for guiding said rule transversely on said drawing board, and actuating means connected to said viewing direction bar and to said guiding means and being movable in response to a rocking motion of said viewing direction bar about said axis and adapted to transversely shift said rule to positions indicating said vertical lines of said object, all of said bars, said arms and said rule being movable within planes parallel to said drawing board.

2. The combination claimed in claim 1 comprising a guiding bar rigidly connected with and extending parallel to said viewing direction bar, parallel guideways spaced from said axis and provided on said drawing board, carriages on said guideways, means for mounting the ends of said rule on said carriages, cantilevers one on each of said carriages extending at right angles to said guideways and crossing said guide bar, and pivot pins pivotally and slidably connecting said guide bar to each of said cantilevers and being adjustable lengthwise of and adapted to be fixed to said cantilevers.

3. The combination claimed in claim 1 comprising a guiding bar rigidly connected with and extending parallel to said viewing direction bar, parallel guideways spaced from said axis and provided on said drawing board, carriages on said guideways, means for mounting the ends of said rule on said carriages, cantilevers one on each of said carriages extending at right angles to said guideways and crossing said guide bar, pivot pins pivotally and slidably connecting said guide bar to each of said cantilevers and being adjustable lengthwise of and adapted to be fixed to said cantilevers, the element referred to in claim 1 constituting a rod extending parallel to said viewing direction bar, and a slide bar slidable lengthwise on said guiding bar and rigidly connected with said rod, one of said pivot pins being adjustable lengthwise of and adapted to be fixed to both one of said cantilevers and to said slide bar.

4. The combination claimed in claim 1 in which said linkage comprises a lever fulcrumed to said element, the latter being constituted by a rod extending parallel to said viewing direction bar and guided along the same, a link connecting said lever to said picture plane representing bar and extending substantially parallel to said viewing direction bar, a guideway spaced from said axis and provided on said drawing board, a carriage on said guideway and having a cantilever fixed thereto, a bracket fixed to said cantilever, and a pin-and-slot connection between said support and said lever.

5. The combination claimed in claim 1 comprising means for pivotally mounting said radius elements to said slide, said radius elements being formed by bars slidably guided relative to said adjustable slides.

6. The combination claimed in claim 1 in which both said picture plane representing bar and said rule are provided with similar graduations.

7. The combination claimed in claim 1 in which said viewing direction bar, said arms, said radius elements, said picture plane representing bar, and said rule are disposed on the front of said drawing board, whereas said guiding means and said actuating means are disposed on the back of said drawing board.

8. The combination claimed in claim 1 in which said picture plane representing bar and said rule are transparent.

9. The combination claimed in claim 1 in which both of said arms are provided with similar graduations equally spaced from said viewing direction bar.

10. The combination claimed in claim 1 in which said viewing direction bar is provided with a graduation.

HEINRICH STIEBING.

References Cited in the file of this patent

UNITED STATES PATENTS

| Number | Name | Date |
|---|---|---|
| 1,986,625 | De Lorenzi | Jan. 1, 1935 |
| 2,442,117 | Davis | May 25, 1948 |